United States Patent
Rai et al.

(10) Patent No.: US 10,467,574 B2
(45) Date of Patent: Nov. 5, 2019

(54) METHODS AND SYSTEMS OF FORECASTING CUSTOMER DEMAND IN A PRINT PRODUCTION ENVIRONMENT

(71) Applicant: Conduent Business Services, LLC, Dallas, TX (US)

(72) Inventors: Sudhendu Rai, Fairport, NY (US); Ranjit Kumar Ettam, Pradesh (IN)

(73) Assignee: Conduent Business Services, LLC, Florham Park, NJ (US)

( * ) Notice: Subject to any disclaimer, the term of this patent is extended or adjusted under 35 U.S.C. 154(b) by 801 days.

(21) Appl. No.: 15/092,777

(22) Filed: Apr. 7, 2016

(65) Prior Publication Data

US 2016/0300250 A1 Oct. 13, 2016

Related U.S. Application Data

(60) Provisional application No. 62/143,916, filed on Apr. 7, 2015.

(51) Int. Cl.
| | |
|---|---|
| *G06Q 10/00* | (2012.01) |
| *G06Q 10/06* | (2012.01) |
| *G06Q 30/02* | (2012.01) |
| *G06F 17/28* | (2006.01) |
| *G06Q 10/10* | (2012.01) |
| *G06F 16/20* | (2019.01) |
| *G06F 3/12* | (2006.01) |
| *G06N 20/00* | (2019.01) |
| *G06Q 10/04* | (2012.01) |

(52) U.S. Cl.
CPC ......... *G06Q 10/067* (2013.01); *G06F 3/1285* (2013.01); *G06F 3/1288* (2013.01); *G06F 16/20* (2019.01); *G06F 17/289* (2013.01); *G06Q 10/063* (2013.01); *G06Q 10/10* (2013.01); *G06Q 30/0202* (2013.01); *G06N 20/00* (2019.01); *G06Q 10/04* (2013.01)

(58) Field of Classification Search
None
See application file for complete search history.

(56) References Cited

U.S. PATENT DOCUMENTS

| | | | | |
|---|---|---|---|---|
| 6,509,974 | B1 * | 1/2003 | Hansen | G06F 3/1205 358/1.12 |
| 7,162,427 | B1 * | 1/2007 | Myrick | G06Q 10/06 705/348 |
| 7,805,382 | B2 * | 9/2010 | Rosen | G06Q 10/1053 705/321 |
| 7,970,729 | B2 * | 6/2011 | Cozzi | G06F 16/288 707/601 |
| 8,060,394 | B2 * | 11/2011 | Woodings | G06Q 10/06 705/7.13 |
| 8,060,451 | B2 * | 11/2011 | Degeratu | G06Q 10/06 705/319 |
| 8,144,364 | B2 * | 3/2012 | Rai | G06Q 10/06 358/1.9 |

(Continued)

*Primary Examiner* — Gurkanwaljit Singh
(74) *Attorney, Agent, or Firm* — Fox Rothschild LLP (57) ABSTRACT

A system of forecasting future print job demand for a print shop may include a computing device, a print shop having a plurality of print devices in communication with the computing device, a historical database in communication with the computing device, and a computer-readable storage medium comprising one or more programming instructions.

12 Claims, 7 Drawing Sheets

(56) References Cited

U.S. PATENT DOCUMENTS

| | | | |
|---|---|---|---|
| 8,660,876 B2* | 2/2014 | Woodings | G06Q 10/06 705/7.13 |
| 8,896,863 B2 | 11/2014 | Hu et al. | |
| 2003/0225607 A1* | 12/2003 | Kopunovic | G06Q 10/06311 705/7.13 |
| 2004/0267595 A1* | 12/2004 | Woodings | G06Q 10/06 705/7.14 |
| 2005/0060217 A1* | 3/2005 | Douglas | G06Q 10/06 705/7.14 |
| 2006/0080134 A1* | 4/2006 | Toomey | G06Q 10/1053 705/321 |
| 2006/0106825 A1* | 5/2006 | Cozzi | G06F 16/288 |
| 2006/0229896 A1* | 10/2006 | Rosen | G06Q 10/10 705/321 |
| 2006/0250636 A1* | 11/2006 | Richards | G06F 3/1208 358/1.15 |
| 2007/0203778 A1* | 8/2007 | Lowson | G06Q 10/06 705/7.14 |
| 2008/0120129 A1* | 5/2008 | Seubert | G06Q 10/06 705/35 |
| 2008/0231868 A1* | 9/2008 | Onsen | G06F 3/1204 358/1.1 |
| 2008/0313000 A1* | 12/2008 | Degeratu | G06Q 10/06 705/319 |
| 2009/0021774 A1* | 1/2009 | Rai | G06Q 10/06 358/1.15 |
| 2010/0037285 A1* | 2/2010 | Cain | G06F 3/121 726/1 |
| 2010/0211515 A1* | 8/2010 | Woodings | G06Q 10/06 705/320 |
| 2013/0278963 A1* | 10/2013 | Hoarau | G06Q 10/06 358/1.15 |
| 2014/0039956 A1* | 2/2014 | Cicio, Jr. | G06Q 10/063112 705/7.14 |
| 2014/0156686 A1* | 6/2014 | Woodings | G06Q 10/06 707/756 |

* cited by examiner

METHODS AND SYSTEMS OF FORECASTING CUSTOMER DEMAND IN A PRINT PRODUCTION ENVIRONMENT

CROSS-REFERENCE TO RELATED APPLICATIONS

This application claims the priority benefit of U.S. Provisional Patent Application No. 62/143,916, filed on Apr. 7, 2015, which is incorporated by reference in its entirety.

BACKGROUND

Accurate customer demand data is important to print shop design, projection of operational costs for a print shop, determining contract pricing, performing customer account management and/or the like. Demand data from a print shop can be used to simulate and optimize print shop configurations. However, this data collection process can be expensive and time-consuming in many instances.

Bootstrapping is a resampling technique used to study the sampling distribution of an estimator such as, for example, sample mean, sample deviation and/or the like. Bootstrapping typically involves randomly resampling (with replacement) from a sample used as a surrogate population. A sample statistic is computed on each of the bootstrap samples and a sampling distribution is created. For example, given a random sample of size n $(X_1, X_2, X_3, \ldots, X_n)$, the corresponding sample statistic calculated from this sample may be represented by $\hat{\theta} \cdot \hat{\theta}_B$ may represent a random quantity that represents some statistic calculated from the sample such as, for example, a mean, sum of random variables and/or the like. As the limit n→∞, $\hat{\theta}_B$ follows a normal distribution with $\hat{\theta}$ as the center and $$\frac{s}{\sqrt{n}}$$

as the standard deviation, where s is the sample standard deviation computed from $(X_1, X_2, X_3, \ldots, X_n)$.

Bootstrapping is commonly used on underlying distributions that are normal or that belong to an exponential family of distributions. However, heavy-tailed distributions behave quite differently than normal distributions. Because their tails decline relatively slowly, the probability of very large observations is not negligible. Heavy-tailed distributions have infinite variance indicating high variability in the underlying process that generates these distributions.

SUMMARY

This disclosure is not limited to the particular systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimension recited below. As used herein, the term "comprising" means "including, but not limited to."

In an embodiment, a system of forecasting future print job demand for a print shop may include a computing device, a print shop having a plurality of print devices in communication with the computing device, a historical database in communication with the computing device, and a computer-readable storage medium comprising one or more programming instructions. The system may collect a sample of print jobs having a same print job type from a historical database via an electronic communication network, identify an increase value representing a percentage increase in future print job volume for the print shop, and determine a target job volume for the print shop based on a job volume associated with the sample of print jobs and the increase value. The system may identify an acceptance limit and a maximum number of samples and initialize a counter value to a value of one. So long as the counter value is less than or equal to the maximum number of samples, the system may generate a bootstrap sample of the collected sample, determine a sample job volume for the bootstrap sample, determine an acceptance value based on the sample volume, the target job volume and the job volume associated with the sample of print jobs, determine a threshold value based on the acceptance limit and the increase value, and compare the acceptance value to the threshold value. In response to the acceptance value being less than or equal to the threshold value, the system may increment the counter value, and repeat the generating a bootstrap sample, determining a sample job volume, determining an acceptance value, determining a threshold value and comparing the acceptance value to the threshold value.

The system may determine a target job volume based on a job volume associated with the sample of print jobs and the increase value by determining a first value by summing a value of '100' and the increase value, determining a second value by multiplying the job volume associated with the sample of print jobs by the first value, and determining a third value by dividing the second value by a value of '100.'

Optionally, generating a bootstrap sample of the collected sample may include randomly selecting a bootstrap sample from the collected sample.

The system may determine a sample job volume for the bootstrap sample by identifying a job volume associated with each print job in the bootstrap sample and summing the job volumes. The system may determine a threshold value based on the acceptance limit by multiplying the acceptance limit by the increase value. The system may output the bootstrap sample when the counter value exceeds the maximum number of samples. Optionally, the system may perform a robustness test of a print shop to determine one or more performance metrics associated with processing the print jobs of the bootstrap sample by the print shop.

DETAILED DESCRIPTION

The following terms shall have, for purposes of this application, the respective meanings set forth below:

A "computing device," "processing device," or "electronic device" refers to a device that includes a processor and non-transitory, computer-readable memory. The memory may contain programming instructions that, when executed by the processor, cause the computing device to perform one or more operations according to the programming instructions. As used in this description, a "computing device," "processing device," or "electronic device" may be a single device, or any number of devices having one or more processors that communicate with each other and share data and/or instructions. Examples of computing devices, processing devices, or electronic devices include, without limitation, personal computers, servers, mainframes, gaming systems, televisions, and portable electronic devices such as smartphones, personal digital assistants, cameras, tablet computers, laptop computers, media players and the like.

A "historical print job" refers to a print job that has been previously processed by a print shop, a theoretical print job that may be processed by a print shop, a benchmark print job processed by a print shop and/or the like.

A "job" refers to a logical unit of work that is to be completed for a customer in a production environment.

A "job function" refers to one or more processing steps associated with processing a job. In a print production environment, a "print job function" refers to one or more processing steps associated with processing a print job. Example print job functions may include, without limitation, printing, binding, collating, scanning and/or the like.

A "job size" refers to a quantity of a job to be processed. In a print production environment, a "print job size" refers to a quantity of a print job to be processed, such as, for example, a number of pages, a number of impressions, a number of units and/or the like.

A "job type" refers to a combination of one or more job functions required to process a job. In a print production environment, a "print job type" refers to a combination of one or more print job functions required to process a print job.

A "performance metric" is a measure of a print shop's operation. Examples of performance metrics include workspan, turnaround time, print device utilization, energy consumption, number of late print jobs and/or the like.

A "print job" refers to a job processed or to be processed in a print production environment such as, for instance, a print shop.

A "print job function" refers to an operation, such as printing, binding, collating and/or the like that is performed on a print job.

A "print production resource" may be a physical device capable of processing at least a portion of a print job. Example print production resources may include black-and-white printers, color-printers, scanners, inserters, collators, binders, cutters, multi-function devices and/or the like.

A "print shop" refers to a grouping of one or more document production resources, such as printers, cutters, collators and the like. Example print shops include, without limitation, a printing service provider, or it may be a document production group within a corporation or other entity, such as a work area that contains one or more printers. Additionally, a print shop may communicate with one or more servers or other electronic devices by way of a local area network or a wide area network, such as the Internet, the World Wide Web or the like.

"Processing of a print job" means performing one or more print job functions on a print job to transform a print job in some manner and/or result in the display, transmission or conversion of the print job to a physical substrate.

A "production environment" refers to one or more entities having multiple items of equipment to manufacture and/or process items that may be customized based on customer requirements. For example, a vehicle production environment may exist in an automobile assembly plant, where different areas exist to assemble and/or finish portions of the automobile such as the engine, trim, drive train, and other parts. A document production environment or print shop includes document production devices, such as printers, cutters, collators and the like. A chemical, pharmaceutical or other process industry production environment may include production devices such as chemical processing units, vessels, heating equipment, mixing equipment and the like. A production environment may be a free standing entity, including one or more production-related devices, or it may be part of a corporation or other entity. Additionally, the production environment may communicate with one or more servers by way of a local area network or a wide area network, such as the Internet or the World Wide Web.

A "resource" is a physical device capable of processing at least a portion of a job.

Figure 1:
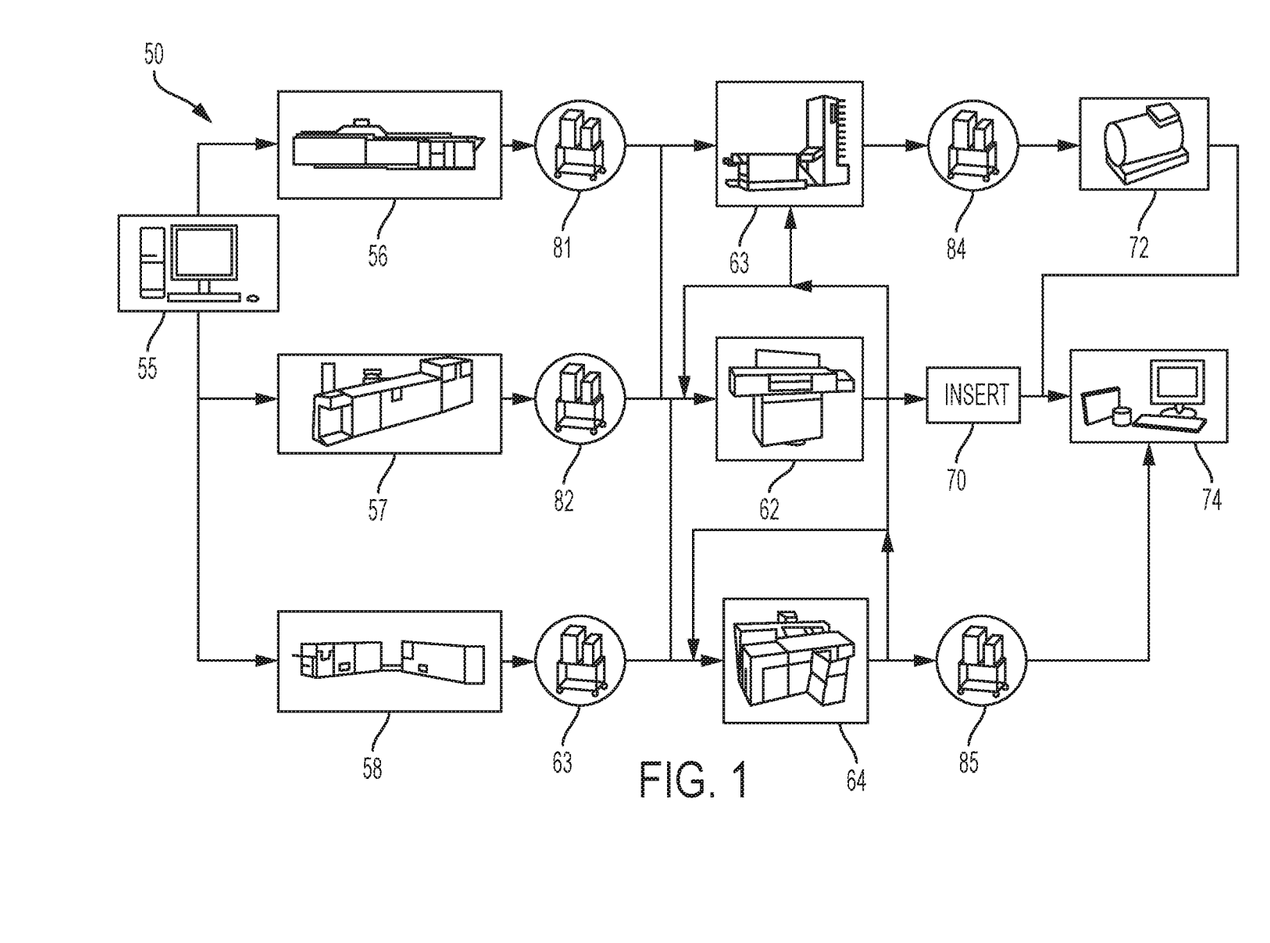
FIG. 1 shows an example of a production environment according to an embodiment.

FIG. 1 shows an example of a production environment 50, in this case, example elements of a print production environment or print shop, according to an embodiment. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Forecasting customer demand is an important activity for the design and optimization of service operations. For instance, in a print production environment, forecasting print job demand over a period of time may help print shop operators better optimize their operations to meet requirements of service level agreements. Forecasting methods such as the ARIMA time series model may be used to predict future customer demand based on historical demand. However, a drawback of this approach is that it does not consider the future market outlook in modeling and it requires a large amount of data to produce a reliable prediction.

Figure 2:
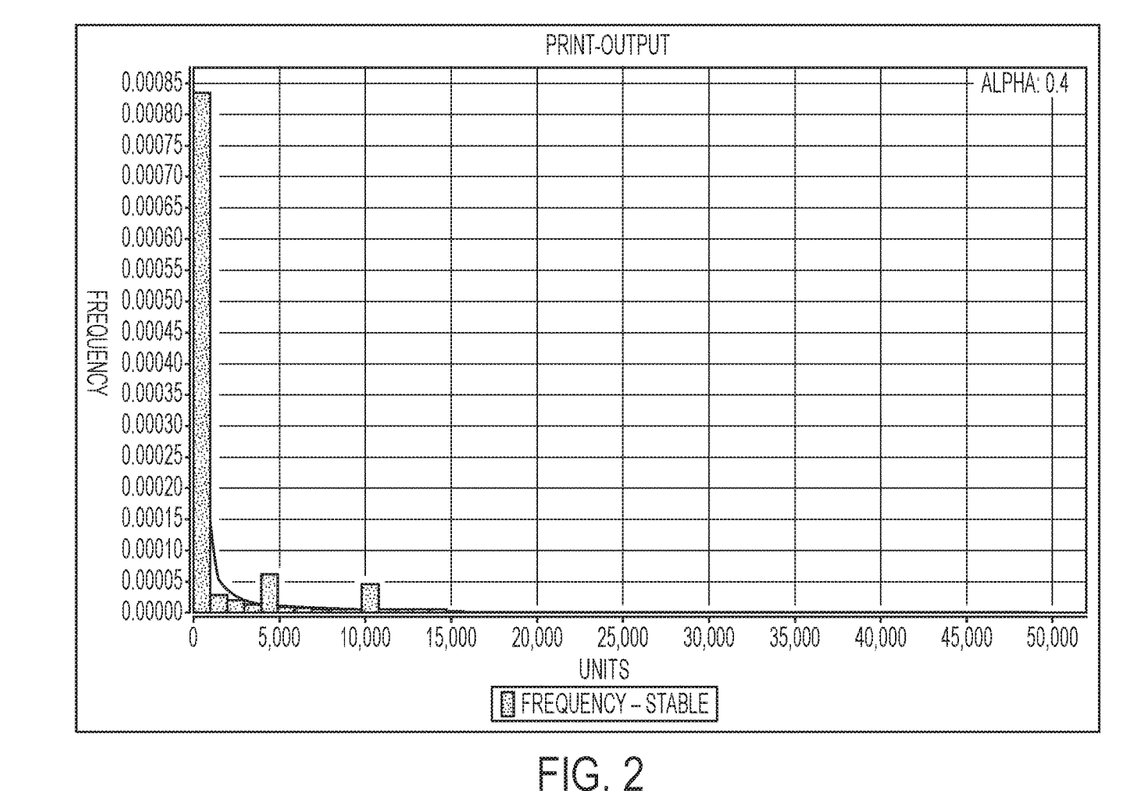
FIG. 2 illustrates an example graphical representation of a heavy-tailed distribution according to an embodiment.

Efron's bootstrapping method may be used to generate future job demand. Efron's bootstrapping method may involve resampling with replacement from an initial sample until the total job volume reaches a target volume. However, the job sizes in large service operations, such as print shops scheduling server farms, file size distributions, Internet traffic, CPU process lifetimes, and econometric applications, often exhibit characteristics of heavy-tailed distributions. A heavy-tailed distribution may be characterized as a job size distribution possessing a tail that decays slowly. In other words, as the value of the random variable increases, a probability associated with the random variable decreases, however there still may be a finite probability associated with very large values of the random variable. If X is a random variable with a distribution function $F(x)=Pr[X \leq x]$ and complementary distribution $\overline{F}(x)=Pr[X>x]$. A distribution is heavy-tailed if $\overline{F}(x)=Pr[X>x]=cx^{-\alpha}, 0<\alpha<2$. FIG. 2 illustrates an example graphical representation of a heavy-tailed distribution according to an embodiment.

The Efron's bootstrapping method is inconsistent when applied to heavy-tailed distributions. The process described in this disclosure pertains to a bootstrapping method that can be used to forecast future job demand that meets a desired total job volume for a job type, even if an underlying distribution contains a heavy-tailed component.

Demand data may be collected from print shop operations and used to simulate and optimize print shop configurations. Often, the collected data exhibits variability and variety. Within a print shop, multiple workflows or job types may simultaneously coexist, with each having its own demand distribution. These demand distributions are often not amenable to description by known closed-form distributions, and can only be described empirically.

Bootstrapping refers to a method that involves random sampling with replacement, and allows estimation of a sampling distribution of a metric using random sampling methods. For example, bootstrapping may include a self-sustaining, non-parametric, computationally-intensive approach to statistical inference used to produce voluminous data. Bootstrapping typically involves resampling (with replacement) from a sample assuming the sample as a surrogate population.

The bootstrapping approach described in this disclosure relies on certain assumptions. First, it is assumed that future job variety doesn't change from a historical pattern and that a percentage increase in future total job volume for each job type is known. Second, it is assumed that for each job type, the job inter-arrival times are exponential with a mean value as the average inter-arrival time and due dates are set to values as requested in a corresponding service level agreement.

Figure 3:
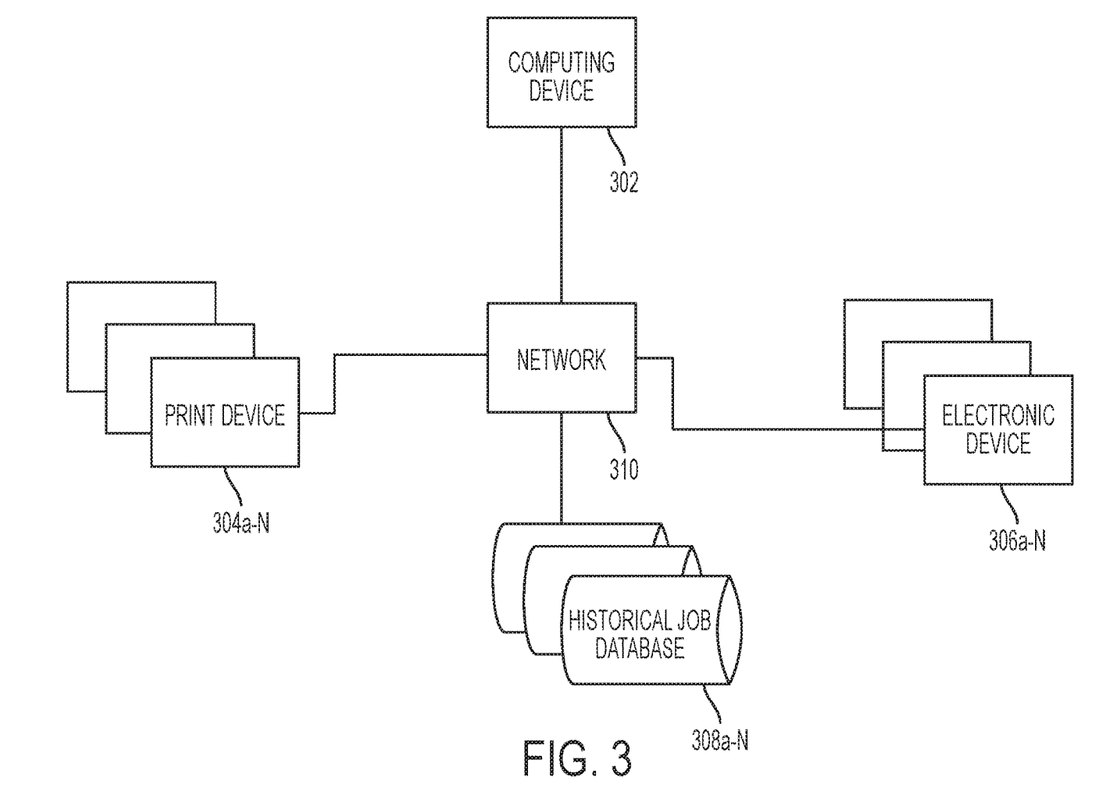
FIG. 3 illustrates an example system of forecasting customer demand according to an embodiment.

FIG. 3 illustrates an example system of forecasting customer demand according to an embodiment. As illustrated by FIG. 3, a system 300 may include a computing device 302 in electronic communication with one or more print devices 304a-N and/or one or more electronic devices 306a-N via one or more communication networks 310. Although FIG. 3 illustrates a single communication network 310, it is understood that multiple communication networks may be used within the scope of this disclosure. One or more of the computing device 302, one or more print devices 304a-N and/or one or more electronic devices 306a-N may include or be in communication with one or more historical job databases 308a-N, which may store information about one or more historical jobs. For instance, a print device 304a-N may have memory on which a historical job database may be stored. The historical job database 308a-N may store historical job information for the print device 304a-N, or one or more other print devices in electronic communication with the print device on which the historical job information is stored. As another example, an electronic device 306a-N in communication with a computing device 302 may contain a historical job database 308a-N which may store historical job information for a plurality of jobs that were processed by one or more print devices 304a-N in communication with the electronic device.

Figure 4:
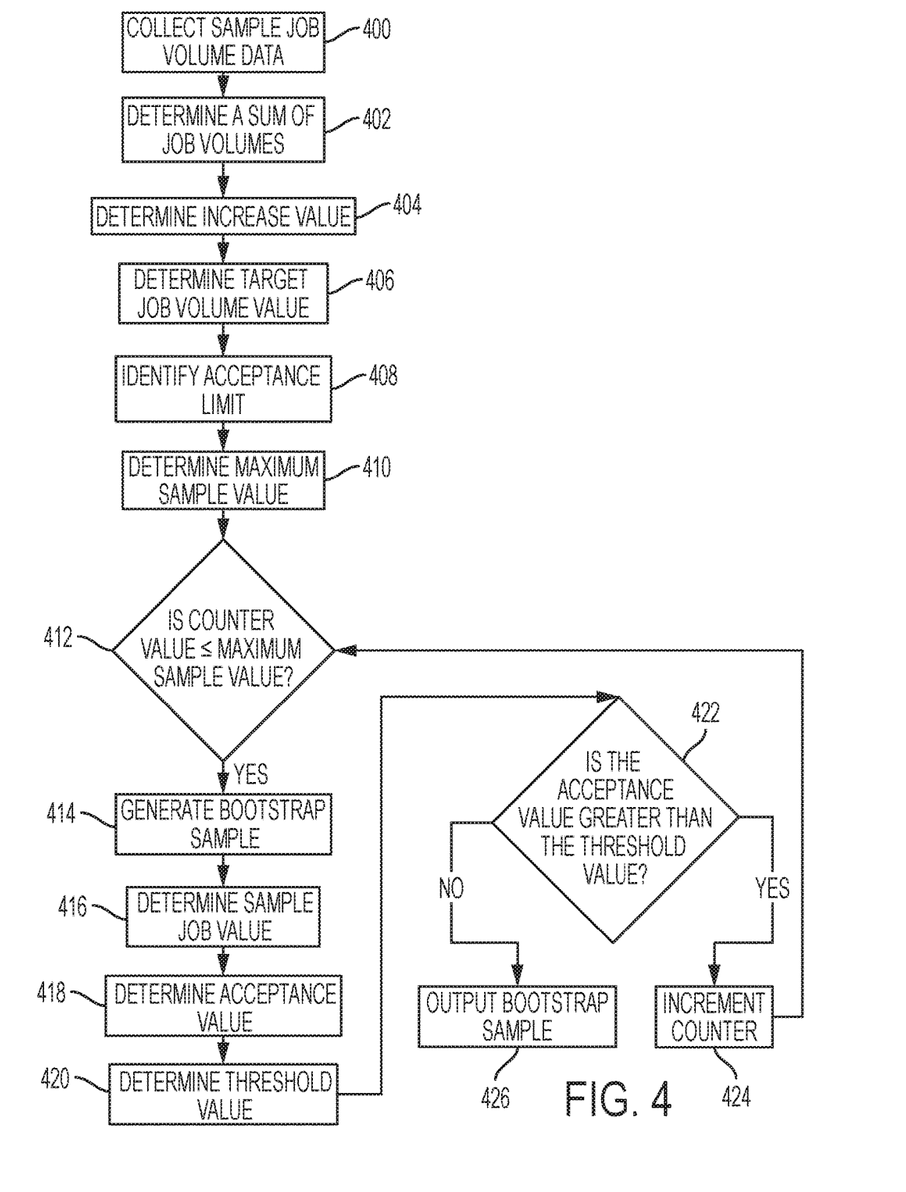
FIG. 4 illustrates a flow chart of an example method of forecasting customer demand according to an embodiment.

FIG. 4 illustrates a flow chart of an example method of forecasting customer demand according to an embodiment. As illustrated by FIG. 4, a computing device may collect 400 sample job volume data. A computing device may collect 400 sample job volume data from historical print job data. For instance, a computing device may identify historical print job data from one or more historical job databases. A historical job database may be stored on a computing device, a print device and/or the like, and may store information about one or more historical jobs such as, for example, print job type, print job functions, and/or the like. In an embodiment, a computing device may collect 400 sample job volume data over a period of time for jobs having the same job type. For instance, in a print production environment, a computing device may collect 400 sample job volume data for print jobs having a print and insert job type, meaning that the print jobs require printing and inserts. Additional and/or alternate print job types may be used within the scope of this disclosure.

In an embodiment, a computing device may determine 402 a sum of job volumes in the collected sample. For instance, a computing device may identify a job volume associated with one or more jobs in the sample, and may sum the identified job volumes to determine 402 a sum of job volumes, represented in this disclosure by S.

In an embodiment, a computing device may determine 404 an increase value. An increase value may be a percentage increase in future job volume over a future time period. For instance, a print shop may process a job volume of ten million impressions in one year. However, an operator may anticipate a job volume of fifteen million impressions in the following year. As such, an increase value of 50% may be used. An increase value may be received by a computing device from a user such as, for example, a production environment operator. In this disclosure, an increase value is represented by $\alpha$.

In certain embodiments, a computing device may determine 406 a target job volume value, represented in this disclosure as $S_{target}$. A target job volume may represent a level of job volume that is desired to forecast customer demand. A computing device may determine 406 a target job volume value as follows:

$$S_{target} = \frac{S(100+\alpha)}{100}$$

As illustrated by FIG. 4, a computing device may identify 408 an acceptance limit (represented in this disclosure as $\varphi$. An acceptance limit refers to a certain portion of an increase value that acts as a maximum threshold limit on sample draws during a bootstrapping process. For example, if the increase value of future job volume is $\alpha\%$, then a computing device may continue to draw samples from the identified sample job volume data until $$\alpha(1-\varphi) \leq \left(\frac{S_m - S}{S}\right) * 100 \leq \alpha(1+\varphi)$$

(as described in more detail below).

In an embodiment, a computing device may determine 410 a maximum sample value. A maximum sample value may be a maximum number of bootstrap samples to be drawn, which may be represented in this disclosure as r. A computing device may determine a maximum number of bootstrap samples by receiving information from a user. For instance a print shop administrator or other user may set a maximum number of samples to be drawn. In another embodiment, a computing device may determine 410 a maximum number of bootstrap samples by identifying a default value.

As illustrated by FIG. 4, a computing device may set a counter value. A counter value may be used to track a number of samples that have been drawn as compared to the maximum sample value. A computing device may initialize a counter value to have a value of '1' to begin, although additional and/or alternate values may be used within the scope of this disclosure.

In an embodiment, a computing device may compare 412 the counter value to the maximum sample value. If the counter value is less than or equal to the maximum sample value, the computing device may generate 414 a bootstrap sample. In certain embodiments, a computing device may generate 414 a bootstrap sample using Efron's bootstrap approach. For instance, a computing device may generate 414 a bootstrap sample by selecting a random sample of the collected sample job volume data.

A computing device may determine 416 a sample job volume for the generated sample, represented in this disclosure as $S_m$. For instance, a computing device may determine the job size of each job in the generated sample, and may sum the job sizes to determine 416 a sample job volume for the generate sample.

In an embodiment, a computing device may determine 418 an acceptance value for the sample. A computing device may determine 418 an acceptance value by receiving a value specified by a user. In another embodiment, a computing device may determine 418 an acceptance value by identifying a default value to use such as, for example, 0.05.

A computing device may determine 420 a threshold value. A computing device may determine 420 a threshold value by multiplying the increase value by the acceptance limit value. A computing device may compare 422 the acceptance value to the threshold value. In response to the acceptance value being greater than the threshold value, the computing device may increment the counter value, and repeat steps 412-422. Otherwise, the computing device may output 324 the bootstrap sample.

The following illustrates example pseudocode corresponding to the process described above with respect to FIG. 4.

1. Let $X_1, X_2, X_3 \ldots X_n$ represent the initial sample job quantities of a job
   type in time period $t$ and $S = \Sigma^n_{l=1} X_n$
2. Get % increase in future job quantity ($\alpha$) for next time period $t + 1$, acceptance limit ($\psi$), maximum number of bootstrap samples to be drawn ($r$),
3. Set $i = 1$, *bootstrapFlag* = true, and *NoSampleFound* = true
4. Do While $i \leq r$ AND *bootstrapFlag* = true
   4.1. Set $m=1$, $s_0= 0$, and *sampleFlag* = false
   4.2. Do While *sampleFlag* = false
       4.2.1. Randomly select a job with replacement from the initial
             sample and set the job quantity as $Y_m$
       4.2.2. Compute $s_m = s_{m-1} + Y_m$
       4.2.3. If $s_m > s$ then
           a. If $\alpha(1 - \psi) \leq \dfrac{S_m - S}{S} \times 100 \leq \alpha(1 + \psi)$ then
           b. Set *sampleFlag* =true, *bootstrapFlag* =false, *NoSampleFound*=false and return the bootstrap sample
           c. Else If $\dfrac{S_m - S}{S} \times 100 > \alpha(1 + \psi)$
           d. *sampleFlag* =true ,*bootstrapFlag* =true
           e. Else
           f. $m=m+1$
           g. End If
       4.2.4. Else
       4.2.5. $m=m+1$
       4.2.6. End if
   4.3. End Loop
   4.4. $i=i+1$
5. End Loop
6. If *NoSampleFound* = True then
7. Return as bootstrap sample cannot be found in $r$ iterations
8. End If In various embodiments, the output bootstrap sample may be used to predict or forecast future customer demand such as, for example, print job demand. Future customer demand may be used to test the robustness of a print shop. A robustness test may identify scenarios in which the operational efficiency of a print shop may be compromised. For example, scenarios such as change in job arrival frequency, job type mix, job content and/or the like may affect the operational efficiency of a print shop.

In an embodiment, a robustness test may be performed to determine whether or not to accept a new customer account. For example, an account manager may generate a set of demand data that accounts for jobs from one or more prospective customers. The demand data may be used to simulate print shop operations. One or more performance metrics associated with the simulated print shop may be analyzed to determine whether the print shop is able to withstand the additional demand associated with the prospective customer account without encountering a significant decline in overall efficiency.

In an embodiment, a computing device may determine that a prospective customer account should be accepted, or automatically accept a prospective customer account, if the computing device determines that accepting the prospective customer account will cause a decline in overall efficiency that does not exceed a threshold value. In an embodiment, a computing device may determine that a prospective customer account should not be accepted, or automatically deny a prospective customer account, if the computing device determines that accepting the prospective customer account will cause a decline in overall efficiency that exceeds a threshold value.

FIGS. 5A, 5B, 6A and 6B illustrate the application of the described bootstrapping method using example print production data according to an embodiment. The data represents that from print jobs having a print and insert job type. There are 11,923 jobs of this type, with a total job volume of 3,558,944 impressions. If the future demand of this job type is expected to increase by $\alpha$%, then the desired total job volume $$S_{target} = \dfrac{3{,}558{,}944 * (100 + \alpha)}{100}.$$

Figure 5A:
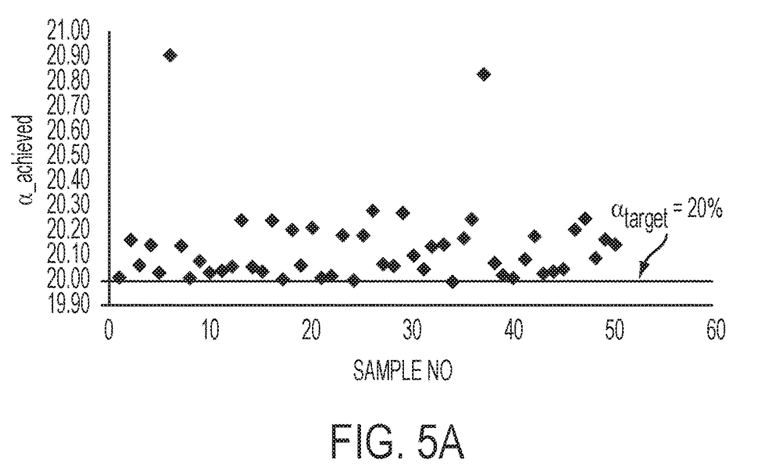
FIGS. 5A and 5B illustrate example values for bootstrap samples obtained using Efron's bootstrapping method according to various embodiments.
Figure 5B:
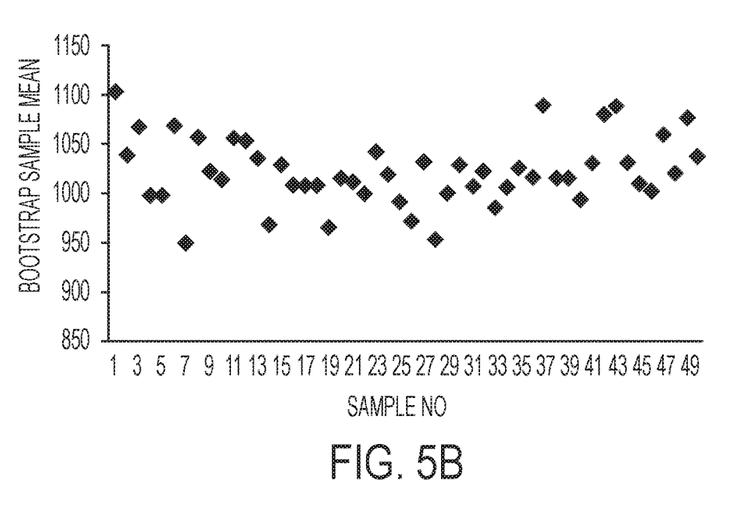

For example, if $\alpha=20\%$, then $S_{target}=4,270,733$. FIG. 5A illustrates example $\alpha_{achieved}$ values for bootstrap samples obtained using Efron's bootstrapping method according to an embodiment. FIG. 5B illustrates example sample mean values for bootstrap samples obtained using Efron's bootstrapping method according to an embodiment.

Figure 6A:
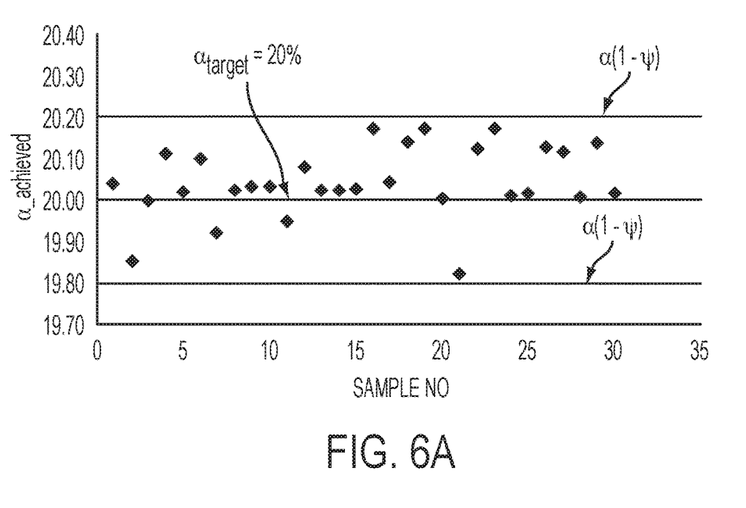
FIGS. 6A and 6B illustrate example values obtained using the bootstrapping method described in this disclosure according to various embodiments.
Figure 6B:
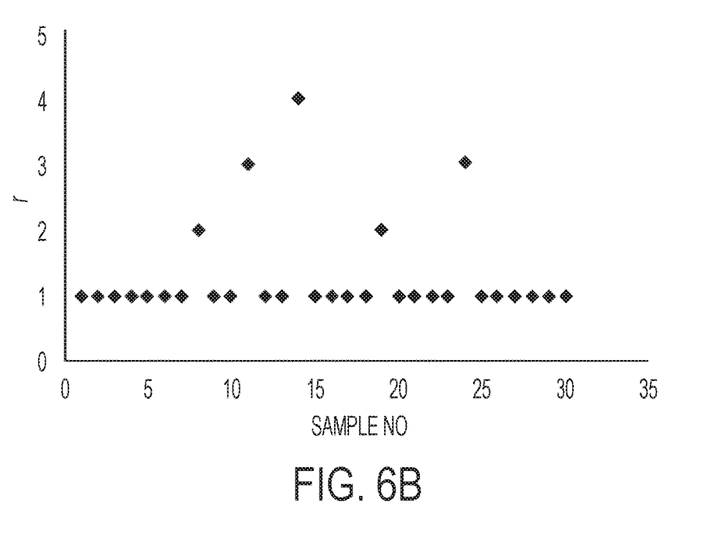

Bootstrap samples that meet the desired 20% increase may be drawn with the parameters $\alpha=20\%$, $\Psi=0.01$, and $r=5$. FIG. 6A illustrates example $\alpha_{achieved}$ values obtained using the bootstrapping method described in this disclosure according to an embodiment. FIG. 6B illustrates example number of repetitions (r) of bootstrap samples obtained using the bootstrapping method described in this disclosure according to an embodiment.

Figure 7:
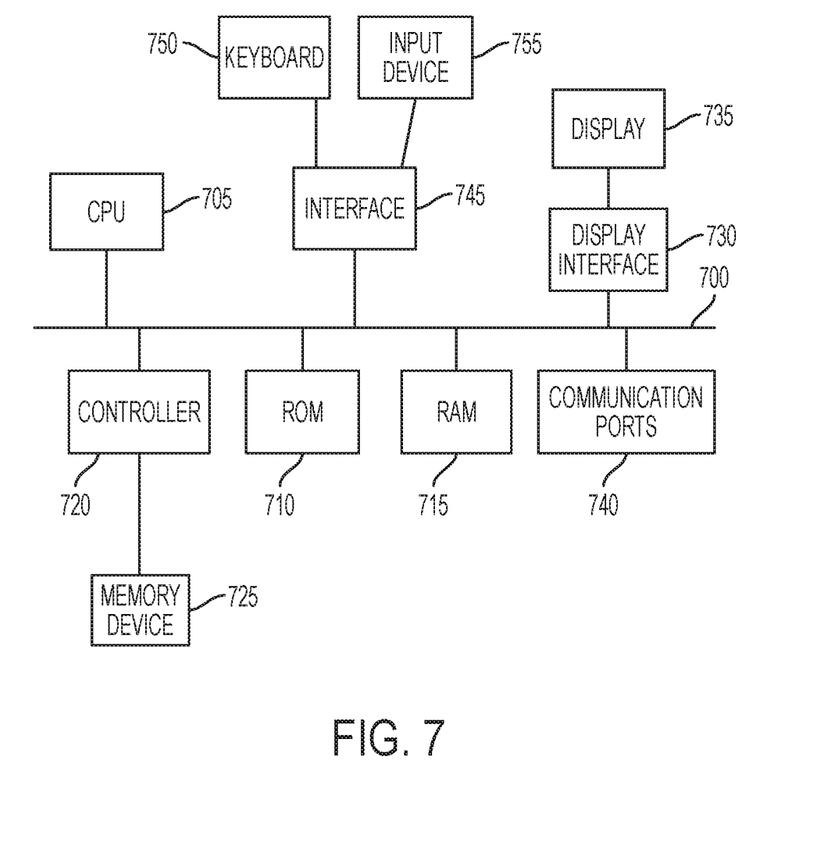
FIG. 7 illustrates a block diagram of example hardware that may be used to contain or implement program instructions according to an embodiment.

FIG. 7 depicts a block diagram of hardware that may be used to contain or implement program instructions. A bus 700 serves as the main information highway interconnecting the other illustrated components of the hardware. CPU 705 is the central processing unit of the system, performing calculations and logic operations required to execute a program. CPU 705, alone or in conjunction with one or more of the other elements disclosed in FIG. 7, is an example of a production device, computing device or processor as such terms are used within this disclosure. Read only memory (ROM) 710 and random access memory (RAM) 715 constitute examples of non-transitory computer-readable storage media.

A controller 720 interfaces with one or more optional non-transitory computer-readable storage media 725 to the system bus 700. These storage media 725 may include, for example, an external or internal DVD drive, a CD ROM drive, a hard drive, flash memory, a USB drive or the like. As indicated previously, these various drives and controllers are optional devices.

Program instructions, software or interactive modules for providing the interface and performing any querying or analysis associated with one or more data sets may be stored in the ROM 710 and/or the RAM 715. Optionally, the program instructions may be stored on a tangible, non-transitory computer-readable medium such as a compact disk, a digital disk, flash memory, a memory card, a USB drive, an optical disc storage medium and/or other recording medium.

An optional display interface 730 may permit information from the bus 700 to be displayed on the display 735 in audio, visual, graphic or alphanumeric format. Communication with external devices, such as a printing device, may occur using various communication ports 740. A communication port 740 may be attached to a communications network, such as the Internet or an intranet.

The hardware may also include an interface 745 which allows for receipt of data from input devices such as a keyboard 750 or other input device 755 such as a mouse, a joystick, a touch screen, a remote control, a pointing device, a video input device and/or an audio input device.

It will be appreciated that the various above-disclosed and other features and functions, or alternatives thereof, may be desirably combined into many other different systems or applications or combinations of systems and applications. Also that various presently unforeseen or unanticipated alternatives, modifications, variations or improvements therein may be subsequently made by those skilled in the art which are also intended to be encompassed by the following claims.

What is claimed is:

1. A method of forecasting future print job demand for a print shop, the method comprising:

collecting, by a computing device, a sample of print jobs having a same print job type from a historical database via an electronic communication network, wherein the sample of print jobs represents potential print jobs from a prospective customer to be processed by a print shop;

identifying an increase value representing a percentage increase in future print job volume for a print shop, wherein the print shop comprises a plurality of print devices;

determining a target job volume for the print shop based on a job volume associated with the sample of print jobs and the increase value;

identifying an acceptance limit and a maximum number of samples;

initializing, by the computing device, a counter value to a value of one;

so long as the counter value is less than or equal to the maximum number of samples, by the computing device:
generating a bootstrap sample of the collected sample,
determining a sample job volume for the bootstrap sample,
determining an acceptance value based on the sample volume, the target job volume and the job volume associated with the sample of print jobs,
determining a threshold value based on the acceptance limit and the increase value, and
comparing the acceptance value to the threshold value, and in response to the acceptance value being less than or equal to the threshold value:
incrementing the counter value, and
repeating the generating a bootstrap sample, determining a sample job volume, determining an acceptance value, determining a threshold value and comparing the acceptance value to the threshold value;

performing, by the computing device, a robustness test of a print shop using the bootstrap sample to determine whether accepting an account of the prospective customer will cause a decline in efficiency of the print shop that does not exceed an efficiency threshold value;

in response to determining that accepting the prospective customer will cause a decline in efficiency of the print shop that does not exceed the efficiency threshold value, automatically accepting the account of the prospective customer.

2. The method of claim 1, wherein determining a target job volume based on a job volume associated with the sample of print jobs and the increase value comprises:
determining a first value by summing a value of '100' and the increase value;
determining a second value by multiplying the job volume associated with the sample of print jobs by the first value; and
determining a third value by dividing the second value by a value of '100'.

3. The method of claim 1, wherein generating a bootstrap sample of the collected sample comprises randomly selecting a bootstrap sample from the collected sample.

4. The method of claim 1, wherein determining a sample job volume for the bootstrap sample comprises identifying a job volume associated with each print job in the bootstrap sample and summing the job volumes.

5. The method of claim 1, wherein determining a threshold value based on the acceptance limit comprises multiplying the acceptance limit by the increase value.

6. The method of claim 1, further comprising outputting the bootstrap sample when the counter value exceeds the maximum number of samples.

7. A system of forecasting future print job demand for a print shop, the system comprising:
- a computing device;
- a print shop comprising a plurality of print devices in communication with the computing device;
- a historical database in communication with the computing device; and
- a computer-readable storage medium comprising one or more programming instructions that, when executed, cause the computing device to:
  - collect a sample of print jobs having a same print job type from a historical database via an electronic communication network, wherein the sample of print jobs represents potential print jobs from a prospective customer to be processed by a print shop,
  - identify an increase value representing a percentage increase in future print job volume for the print shop,
  - determine a target job volume for the print shop based on a job volume associated with the sample of print jobs and the increase value,
  - identify an acceptance limit and a maximum number of samples,
  - initialize a counter value to a value of one,
  - so long as the counter value is less than or equal to the maximum number of samples:
    - generate a bootstrap sample of the collected sample,
    - determine a sample job volume for the bootstrap sample,
    - determine an acceptance value based on the sample volume, the target job volume and the job volume associated with the sample of print jobs,
    - determine a threshold value based on the acceptance limit and the increase value, and
    - compare the acceptance value to the threshold value, and in response to the acceptance value being less than or equal to the threshold value:
      - increment the counter value, and
      - repeat the generating a bootstrap sample, determining a sample job volume, determining an acceptance value, determining a threshold value and comparing the acceptance value to the threshold value,
  - performing a robustness test of a print shop using the bootstrap sample to determine whether accepting an account of the prospective customer will cause a decline in efficiency of the print shop that does not exceed an efficiency threshold value,
  - in response to determining that accepting the prospective customer will cause a decline in efficiency of the print shop that does not exceed the efficiency threshold value, automatically accepting the account of the prospective customer.

8. The system of claim 7, wherein the one or more programming instructions that, when executed, cause the computing device to determine a target job volume based on a job volume associated with the sample of print jobs and the increase value comprise one or more programming instructions that, when executed, cause the computing device to:
- determine a first value by summing a value of '100' and the increase value;
- determine a second value by multiplying the job volume associated with the sample of print jobs by the first value; and
- determine a third value by dividing the second value by a value of '100'.

9. The system of claim 7, wherein the one or more programming instructions that, when executed, cause the computing device to generate a bootstrap sample of the collected sample comprise one or more programming instructions that, when executed, cause the computing device to randomly select a bootstrap sample from the collected sample.

10. The system of claim 7, wherein the one or more programming instructions that, when executed, cause the computing device to determine a sample job volume for the bootstrap sample comprise one or more programming instructions that, when executed, cause the computing device to identify a job volume associated with each print job in the bootstrap sample and summing the job volumes.

11. The system of claim 7, wherein the one or more programming instructions that, when executed, cause the computing device to determine a threshold value based on the acceptance limit comprise one or more programming instructions that, when executed, cause the computing device to multiply the acceptance limit by the increase value.

12. The system of claim 7, wherein the computer-readable storage medium further comprises one or more programming instructions that, when executed, cause the computing device to output the bootstrap sample when the counter value exceeds the maximum number of samples.

* * * * *